(12) United States Patent
Lin

(10) Patent No.: US 8,656,063 B1
(45) Date of Patent: Feb. 18, 2014

(54) METHOD OF DETECTING ADDRESSING MODE AND ELECTRONIC SYSTEM THEREOF

(71) Applicant: Ralink Technology Corp., Hsinchu County (TW)

(72) Inventor: Chan-Shih Lin, Taipei (TW)

(73) Assignee: Ralink Technology Corp., Jhubei, Hsinchu County (TW)

( * ) Notice: Subject to any disclaimer, the term of this patent is extended or adjusted under 35 U.S.C. 154(b) by 0 days.

(21) Appl. No.: 13/672,720

(22) Filed: Nov. 9, 2012

(51) Int. Cl.
*G06F 3/00* (2006.01)
*G06F 12/00* (2006.01)

(52) U.S. Cl.
USPC .............................. 710/10; 711/103

(58) Field of Classification Search
None
See application file for complete search history.

(56) References Cited

U.S. PATENT DOCUMENTS

| | | | |
|---|---|---|---|
| 2003/0145141 A1* | 7/2003 | Chen et al. | 710/74 |
| 2005/0204092 A1* | 9/2005 | Masuyama et al. | 711/103 |
| 2006/0132822 A1* | 6/2006 | Walmsley | 358/1.14 |
| 2006/0139681 A1* | 6/2006 | Walmsley | 358/1.14 |
| 2008/0307154 A1* | 12/2008 | Naderi et al. | 711/103 |

* cited by examiner

*Primary Examiner* — Hyun Nam
(74) *Attorney, Agent, or Firm* — Winston Hsu; Scott Margo

(57) ABSTRACT

The present invention discloses a method for determining an addressing mode of a storage device. The method comprises issuing a first address and a second address in a first addressing mode; converting the first address and the second address as a first device address and a second device address, respectively, according to the addressing mode of the storage device; acquiring a first data according to the first device address; acquiring a second data according to the second device address; and determining whether the addressing mode of the storage device is the first addressing mode or a second addressing mode according to whether the first data and the second data are the same; wherein the first addressing mode comprises more bytes than the second addressing mode.

20 Claims, 8 Drawing Sheets

METHOD OF DETECTING ADDRESSING MODE AND ELECTRONIC SYSTEM THEREOF

BACKGROUND

The present invention relates to a method and electronic circuit thereof, and more particularly, to a method capable of detecting an addressing mode of a storage device and electronic system thereof.

Generally, an electronic system, such as a system-on-chip (SOC) system, needs an external storage device for booting operation. As technology advances, the capacity of the storage device becomes larger. An addressing mode of the storage device therefore needs to contain more bytes for addressing data stored in the storage device. For example, if the external storage device is a serial peripheral interface (SPI) flash memory and the capacity of which is less than 16 MB, the storage device may uses a 3-byte addressing mode for addressing data. Instead, if the storage device is an SPI flash memory and the capacity of which is more than 16 MB, the storage device may use a 4-byte addressing mode for addressing data. With storage devices using different addressing modes, the electronic system therefore needs an additional bootstrap bin for indicating an addressing mode of the storage device, which complicates the trace of the electronic system.

Specifically, please refer to FIG. 1, which is a schematic diagram of a conventional electronic system 10. The electronic system 10 comprises a processing module 100, a storage device 102 and an accessing module 104. In detail, code segments that are going to be executed by the processor module 100 are stored in the storage device 102. The storage device 102 may be an SPI flash memory. When the electronic system 10 starts a booting operation, the processing module 100 issues commands including an address to the accessing module 104. The accessing module 104 then transmits the commands to the storage device 102 according to an addressing mode instructed by a bootstrap bin BS via a related bus, for fetching a specific code segment stored in the storage device 102. After interpretation, the specific code segment is usually a specific instruction used by the processing module 100. The processing module 100 uses the specific instruction to execute various actions or data processing.

As can be seen, if the addressing mode of the storage device 102 can be automatically detected instead of being indicated by the bootstrap bin BS, the bootstrap bin BS can be removed, such that the trace of the electronic system 10 can be simplified and the manufacture cost of the electronic system 10 can be reduced.

SUMMARY

Therefore, the present invention discloses a method for automatically detecting an addressing mode of a storage device and related electronic system.

The present invention discloses a method for detecting an addressing mode of a storage device. The method comprises issuing a first address and a second address in a first addressing mode; converting the first address and the second address as a first device address and a second device address, respectively, according to the addressing mode of the storage device; acquiring a first data according to the first device address; acquiring a second data according to the second device address; and determining whether the addressing mode of the storage device is the first addressing mode or a second addressing mode according to whether the first data and the second data are the same; wherein the first addressing mode comprises more bytes than the second addressing mode.

The present invention further discloses an electronic system. The electronic system comprises a processing module, for outputting an addressing signal; a storage device for storing execution data; and a accessing module, for accessing execution data stored in the storage device according to the addressing signal, comprising a detection unit, coupled to the processing module for outputting a plurality of commands comprising a first address and a second address to acquire a first data and a second data, detecting an addressing mode of the storage device by comparing a first data and a second data acquired from the storage device, outputting a control signal according to whether the addressing mode of the storage device is detected and outputting a mode control signal according to the detected addressing mode a multiplexer, coupled to the processing module and the detection unit, for switching connections of the detection unit, the processing module and a data terminal according to the control signal; and a storage device controller, coupled to the multiplexer and the storage device, for exchanging signals between the data terminal and the storage device according to the mode control signal.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
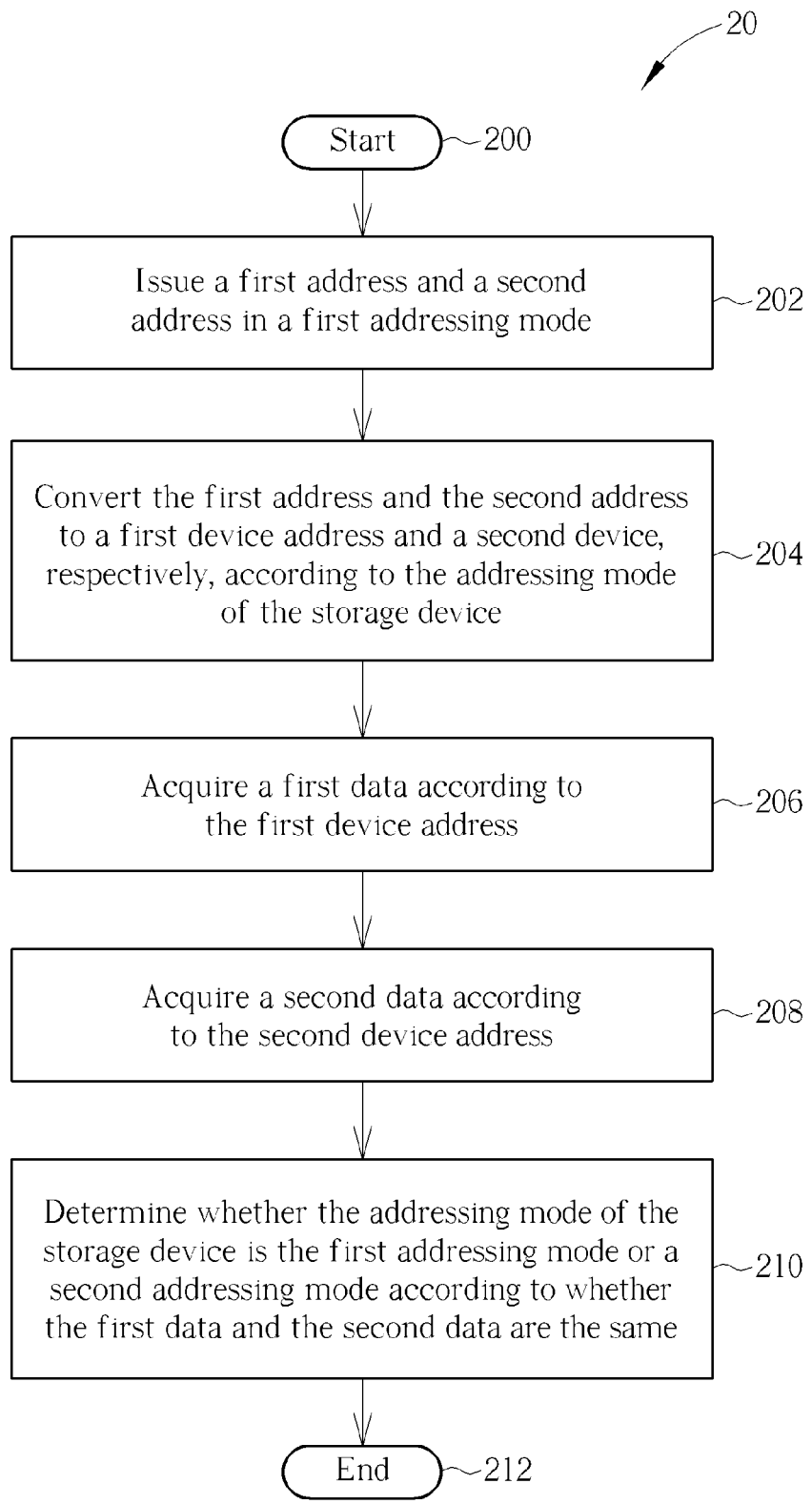
FIG. 2 is a schematic diagram of a method according to an embodiment of the present invention.

Please refer to FIG. 2, which is a schematic diagram of a method 20 for detecting an addressing mode of a storage device according to an embodiment of the present invention. As shown in FIG. 2, the method 20 comprises:

Step 200: Start.

Step 202: Issue a first address and a second address in a first addressing mode.

Step 204: Convert the first address and the second address to a first device address and a second device, respectively, according to the addressing mode of the storage device.

Step 206: Acquire a first data according to the first device address.

Step 208: Acquire a second data according to the second device address.

Step 210: Determine whether the addressing mode of the storage device is the first addressing mode or a second addressing mode according to whether the first data and the second data are the same.

Step 212: End.

Note that, the first addressing mode comprises more bytes than the second addressing mode and the first data and the second data comprises the same number of bytes.

Specifically, the method 20 can be utilized for detecting whether the addressing mode of the storage device in an electronic system, e.g. an SPI flash memory, is the first addressing mode or the second addressing mode when the electronic system starts booting operation and the addressing mode of the storage device is not determined. First, in step 202, the first address and the second address are issued in the first addressing mode and are designed for acquiring different or the same data according to the addressing mode of the storage device. Preferably, the second address equals the first address plus a least significant bit (LSB) with the first addressing mode. The first address and the second address are then converted to the first device address and the second device address according to the addressing mode of the storage device. Since the first addressing mode comprises more bytes than the second addressing mode, the LSB of the first address and the LSB of the second address are ignored if the addressing mode of the storage device is the second addressing mode. In other words, the first device address equals the second device address when the addressing mode of the storage device is the second addressing mode, and does not equal the second device address when the addressing mode of the storage device is the first addressing mode. Next, the first data and the second data are acquired according to the first device address and the second device address. For example, the first data is acquired by reading a fixed number of contiguous bytes starting at the first device address as the first data and the second data are acquired by reading the fixed number of contiguous bytes starting at the second device address. The addressing mode of the storage device therefore can be determined by comparing the first data and the second data. When the first data does not equal the second data (i.e. the first device address does not equal the second device address), the addressing mode of the storage device is the first addressing mode. Otherwise, the addressing mode of the storage device is the second addressing mode.

Figure 3A:
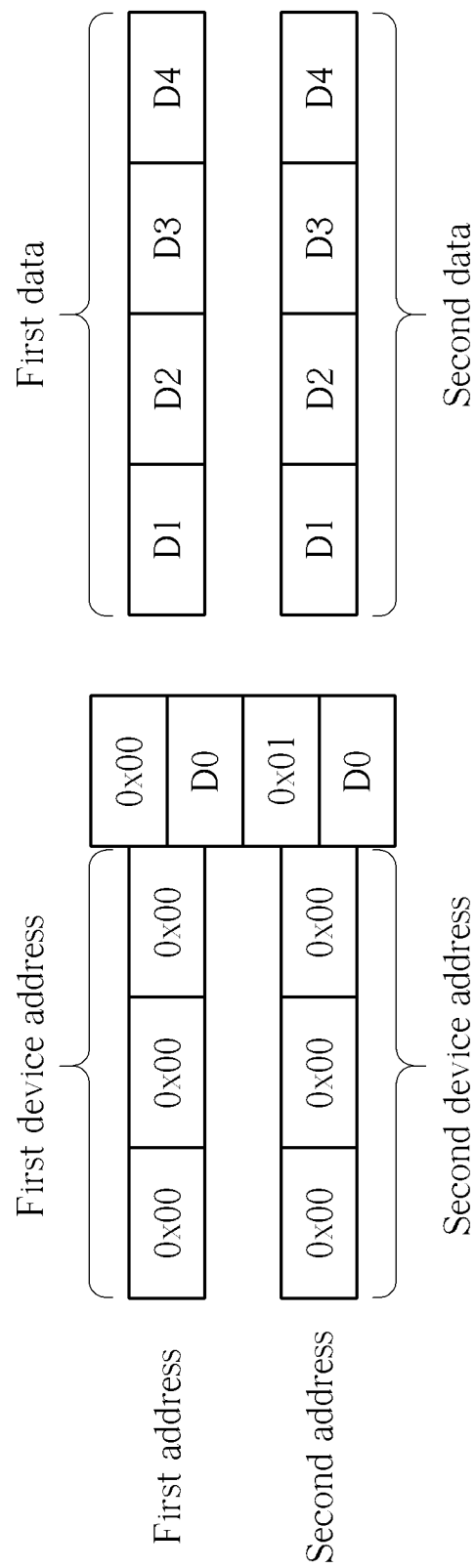
FIG. 3A and FIG. 3B are schematic diagrams of related signals of exemplary embodiments of the method shown in FIG. 2.
Figure 3B:
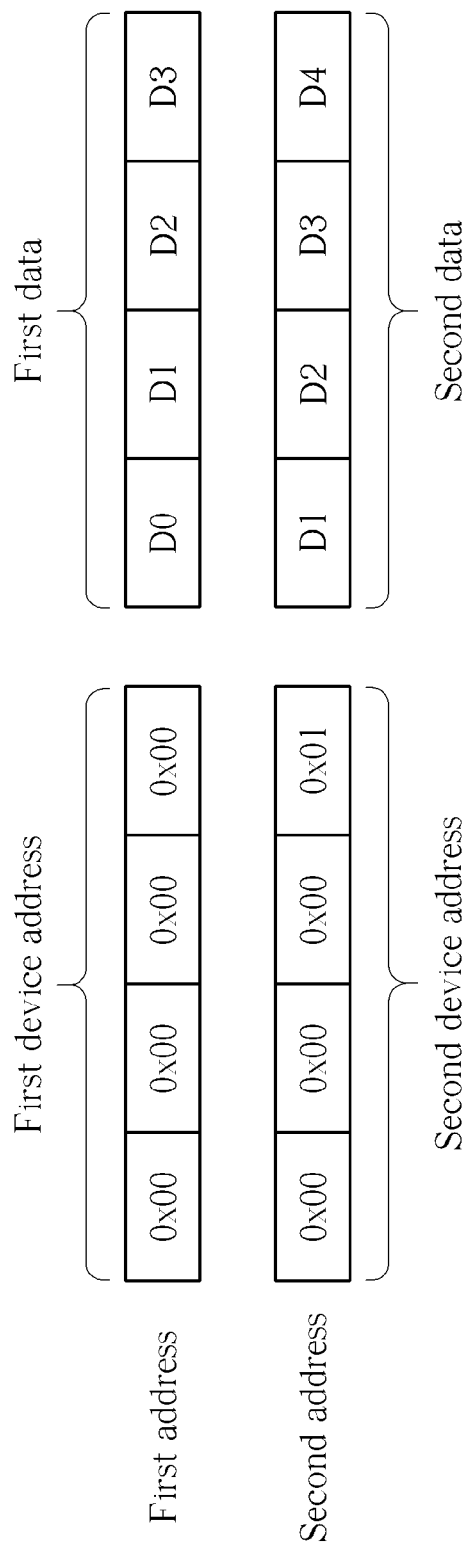

For illustrative purpose of the concept of the embodiment shown in FIG. 2, please refer to FIG. 3A and FIG. 3B, which are schematic diagrams of related signals when the method 20 is utilized for determining whether the addressing mode of the storage device is 4-byte addressing mode (the first addressing mode) or 3-byte addressing mode (the second addressing mode). As shown in FIG. 3A, the first address and the second address are issued in 4-byte addressing mode and the second address equals the first address plus an LSB. However, when the addressing mode of the storage device is 3-byte addressing mode and the first address and the second address are issued in 4-byte addressing mode, the LSB of the first address and the LSB of the second address cannot be recognized. The first address and the second address are recognized as the same address (i.e. the first device address equals the second device address). Then, contiguous bytes D[1]-D[4] starting at the same address are read as the first data and the second data. The first data and the second data are therefore the same. Note that, a byte D[0] is omitted because the LSB of the first address and the LSB of the second address are transmitted. In other words, if the first data equals the second data, the addressing mode of the storage device is 3-byte addressing mode.

Next, please refer to FIG. 3B. When the addressing mode of the storage device is 4-byte addressing mode and the first address and the second address are issued in 4-byte addressing mode, the LSB of the first address and the LSB of the second address can be recognized. The second device address therefore equals the first device address shifted by a byte. Accordingly, contiguous bytes D[0]-D[3] read as the first data and contiguous bytes D[1]-D[4] read as the second data are different. In other words, a sequence of the first data and a sequence of the second data are different. Thus, if the first data does not equal the second data, the addressing mode of the storage device is 4-byte addressing mode. As a result, the method 20 can detect the addressing mode of the storage device without using the bootstrap pin.

On the other hand, since the first data and the second data starting at different addresses may be the same (e.g. the contiguous bytes D[0]-D[4] are all the same), such that the addressing mode of the storage device is erroneously determined, the operations of acquiring the first data and the second data in the method 20 can be modified. Please refer to FIG. 4, which is a schematic diagram of a method 40 according to an embodiment of the present invention. The method 40 comprises:

Step 400: Start.

Step 402: Issue a first address and a second address in a first addressing mode.

Step 404: Convert the first address and the second address to a first device address and a second device, respectively, according to the addressing mode of the storage device.

Step 406: Skip the first device address by a specific amount of bytes until a first plurality of contiguous bytes are not all the same, to acquire a first detection address.

Step 408: Acquire a first data by reading the first plurality of contiguous bytes starting at the first detection address.

Step 410: Skip the second device address by the specific amount of bytes to acquire a second detection address.

Step 412: Acquire a second data by reading a second plurality of contiguous bytes starting at the second detection address.

Step 414: Determine whether the addressing mode of the storage device is the first addressing mode or a second addressing mode according to whether the first data and the second data are the same.

Step 416: End.

Note that, the first addressing mode comprises more bytes than the second addressing mode, and the first data and the second data comprises the same number of bytes. As a result, the method 40 can detect the addressing mode of the storage device without erroneously determining the addressing mode of the storage device when the first data and the second data starting at different addresses are the same.

Specifically, different from the method 20, the method 40 skips the first device address and the second device address by the specific amount of bytes before acquiring the first data and the second data, for ensuring the contiguous bytes read as the first data are not all the same, to avoid from erroneously determining the addressing mode of the storage device. In detail, the steps 400-404, 414 and 416 are similar to the steps 200-204, 210 and 212 of the method 20, and are not narrated herein for brevity. In the steps 406 and 408, the first device address is skipped by the specific amount of bytes until contiguous bytes that are going to be read as the first data are not all the same, to acquire the first detection address. The first data is then acquired by reading a fixed number of contiguous bytes starting at the first detection address. In the steps 410 and 412, the second device address is skipped by the specific amount of bytes to acquire the second detection address. The second data is then acquired by reading the fixed number of contiguous bytes starting at the second detection address. Since the first detection address and the second detection address are generated by skipping the same amount of bytes from the first device address and the second device address, respectively, the addressing mode of the storage device can be correctly determined according to whether the first data equals the second data when the contiguous bytes starting at the first device address and the second device address are all the same.

Figure 4:
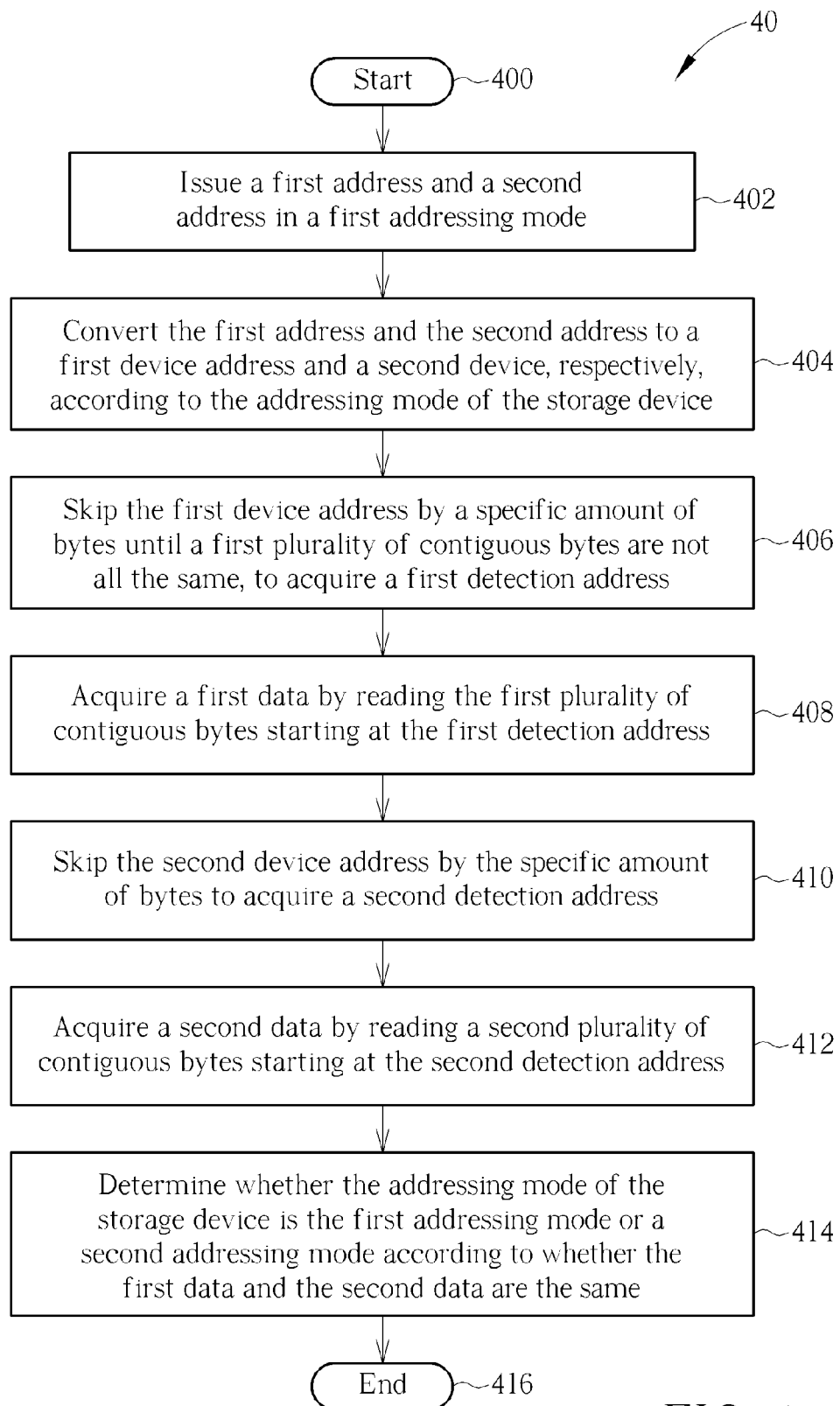
FIG. 4 is a schematic diagram of a method according to an embodiment of the present invention.
Figure 5A:
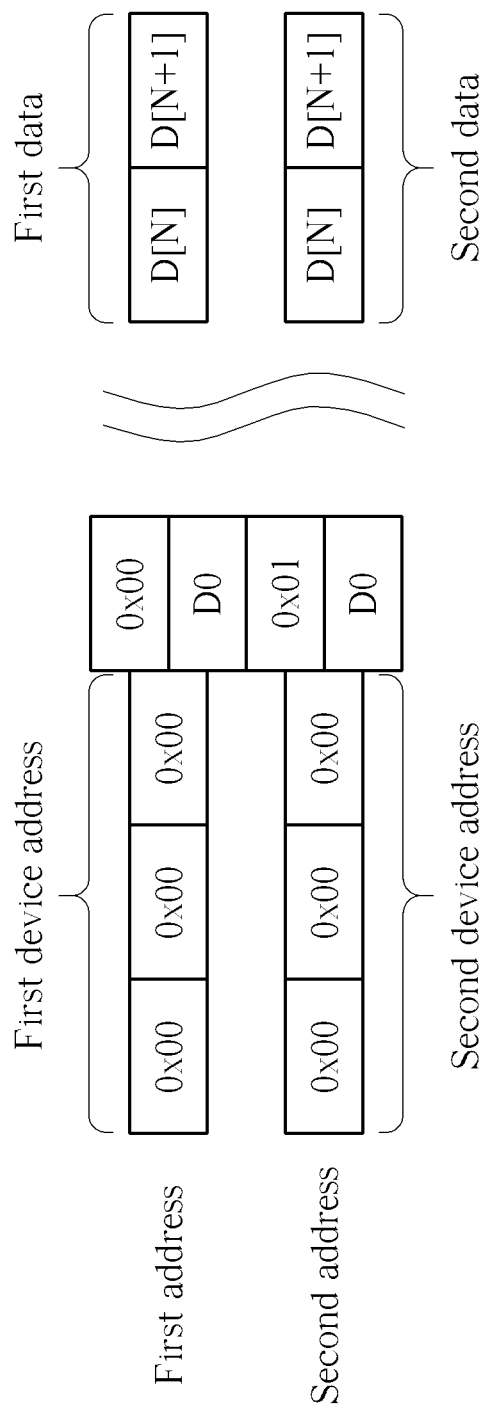
FIG. 5A and FIG. 5B are schematic diagrams of related signals of exemplary embodiments of the method shown in FIG. 4.
Figure 5B:
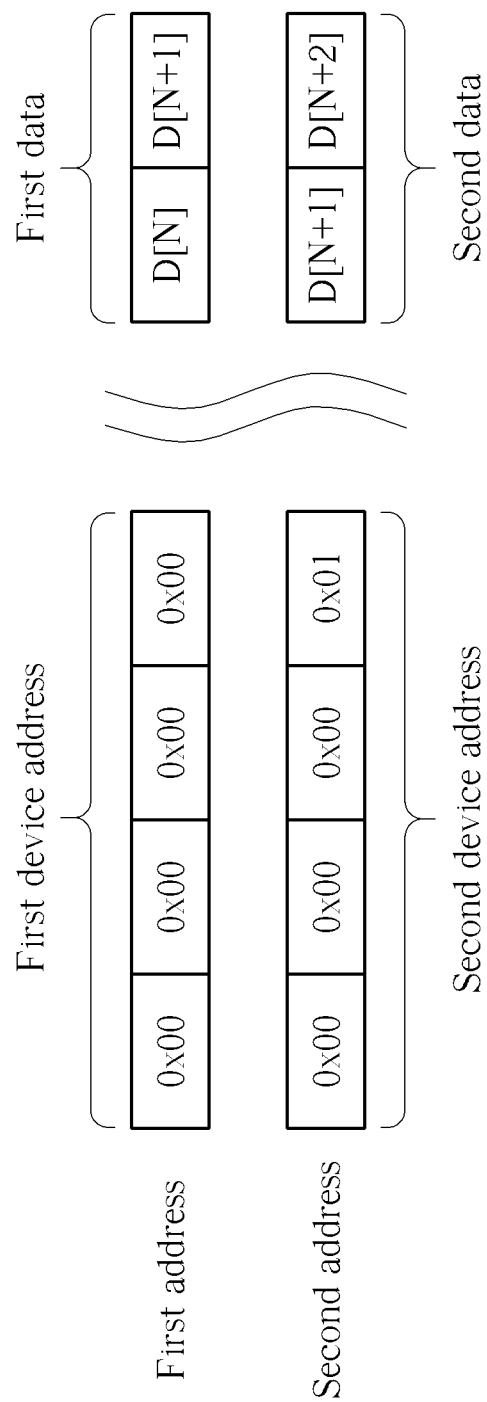

For illustrative purpose of the concept of the embodiment shown in FIG. 4, please refer to FIG. 5A and FIG. 5B, which are schematic diagrams of related signals when the method 40 is utilized for determining whether the addressing mode of the storage device is 4-byte addressing mode (the first addressing mode) or 3-byte addressing mode (the second addressing mode). As shown in FIG. 5A, the first address and the second address are issued in 4-byte addressing mode and the second address equals the first address plus an LSB. However, when the addressing mode of the storage device is 3-byte addressing mode, and the first address and the second address are issued in 4-byte addressing mode, the LSB of the first address and the LSB of the second address cannot be recognized. The first address and the second address are therefore recognized as the same address (the first device address equals the second device address). Then, the first device address is skipped by n bytes until byte D[n] is different from byte D[n+1]. Next, the bytes D[n] and D[n+1] are read as the first data. Since the second device address equals the first device address, the second data are also the bytes D[n] and D[n+1]. The first data and the second data are therefore the same. In other words, if the first data equals the second data, the addressing mode of the storage device is 3-byte addressing mode.

Next, please refer to FIG. 5B. When the addressing mode of the storage device is 4-byte addressing mode, and the first address and the second address are issued in 4-byte addressing mode, the LSB of the first address and the LSB of the second address can be recognized. The second device address therefore equals the first device address shifted by a byte. The first device address is skipped by n bytes until byte D[n] is different from byte D[n+1]. The bytes D[n] and D[n+1] are read as the first data. Next, the second device address is skipped by n bytes. Since the second device address equals the first device address shifted by a byte, the second data is acquired by reading bytes D[n+1] and D[n+2]. Since the byte D[n] is different from the byte D[n+1], the first data and the second data are different. In other words, if the first data does not equal the second data, the addressing mode of the storage device is 4-byte addressing mode. As a result, the method 40 can detect the addressing mode of the storage device without erroneously determining the addressing mode of the storage device when the contiguous bytes starting at the first device address and the second device address are all the same.

Noticeably, the main concept of the above embodiments is issuing different addresses in a specific addressing mode for acquiring two data according to the addressing mode of the storage device, to determine the addressing mode of the storage device by comparing the two data. According to different applications, those skilled in the art can observe appropriate modifications and alternations. For example, the method of the present invention can be utilized for determining a plurality of addressing modes by issuing a plurality of addresses in a specific addressing mode and comparing data acquired according to the plurality of addresses and the addressing mode of the storage device.

As to the implementation of the method for detecting the addressing mode of the storage device, those skilled in the art can implement the method via software or hardware. For example, the methods 20 and 40 can be implemented in a computer product including a memory. The memory can be any data storage device, such as a read-only memory (ROM), for storing data which contain a program code compiled from the methods 20 and 40. The program code can be read and executed by a processor, to execute and achieve the steps of the methods 20 and 40.

Figure 1:
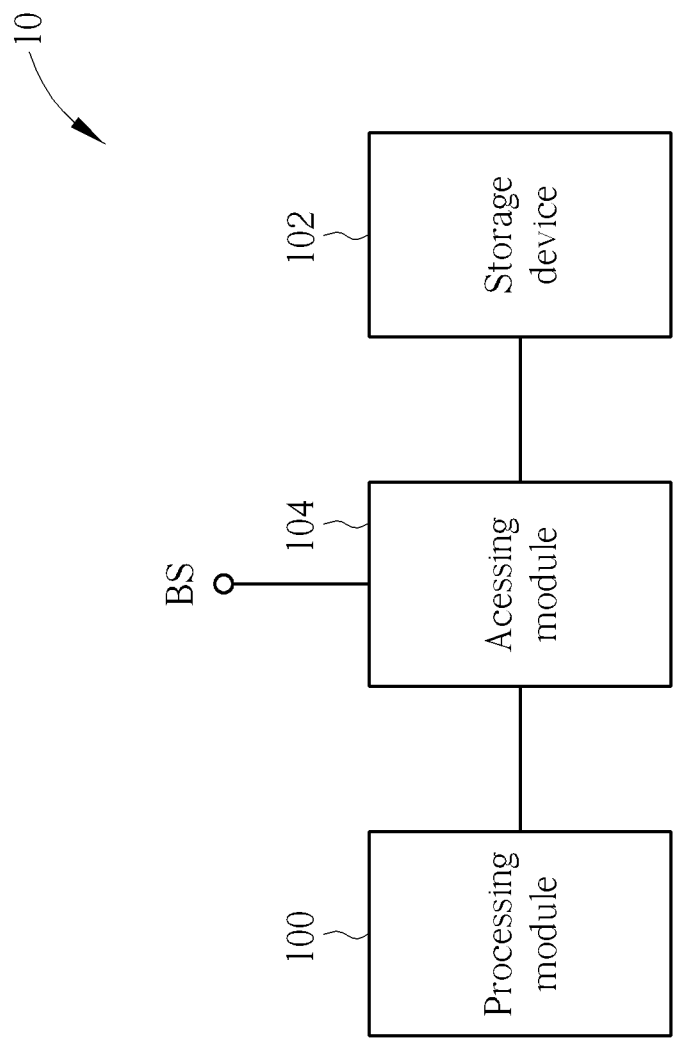
FIG. 1 is a schematic diagram of a conventional electronic system.
Figure 6:
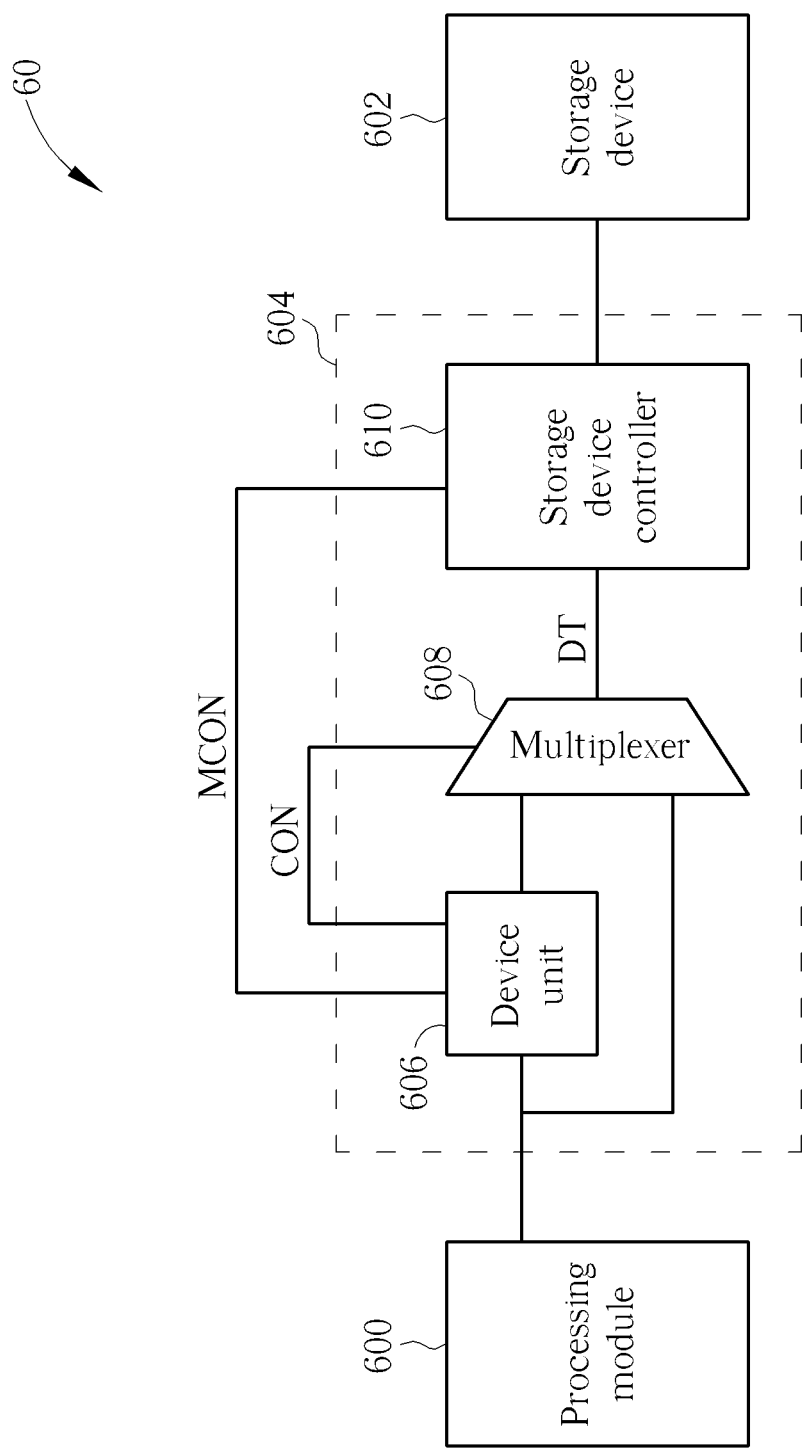
FIG. 6 is a schematic diagram of an electronic system according to an embodiment of the present invention.

Alternatively, please refer to FIG. 6, which is a schematic diagram of an electronic system 60 according to an embodiment of the present invention. The structure and the composition of the electronic system 60 can be different according to different applications. Therefore, in brief, a processing module 600, a storage device 602 and an accessing module 604 of the electronic system 60 are shown in FIG. 6, the components unrelated to the concept of the present invention, such as connection interface, address decoder, are not shown in FIG. 6. The processing module 600 and the storage device 602 are similar to those of the electronic system 10 shown in FIG. 1. Different from the accessing module 104 of the electronic system 10, the accessing module 604 can further perform the method 20 or method 40 for detecting whether an addressing mode of the storage device 602 is an addressing mode AM1 or an addressing mode AM2 when the electronic system 60 starts booting operation and the addressing mode of the storage device 602 is not detected by the accessing module 604, or when the accessing module 604 receives commands from the processing module 600 and the addressing mode of the storage device 602 is not detected by the accessing module 604. Note that, the addressing mode AM1 comprises more bytes than the addressing mode AM2. In other words, the accessing module 604 does not need a bootstrap bin for indicating the addressing mode of the storage device 602. Instead, the accessing module 604 can automatically detect the addressing mode of the storage device 602 and exchange data between the processing module 600 and the storage device 602 correctly.

Specifically, the accessing module 604 comprises a detection unit 606, a multiplexer 608 and a storage device controller 610. The detection unit 606 may be a state machine and is coupled to the processing module 600 for issuing a plurality of testing commands for acquiring a first data and a second data and comparing the first data and the second data, to determine the addressing mode of the storage device 602. The multiplexer 608 is coupled to the processing module 600 and the detection unit 606 for switching connections of the processing module 600, the detection unit 606 and a data terminal DT according to a control signal CON generated by the detection unit 606. The storage device controller 610 is coupled to the data terminal DT for exchanging signals between the data terminal DT and the storage device 602 according to a mode control signal MCON generated by the detection unit 606. As a result, the detection unit 606 may perform the method 20 or the method 40 for detecting the addressing mode of the storage device 602 when the electronic system 60 starts booting operation and the addressing mode of the storage device 602 is not detected by the accessing module 604, or when the accessing module 604 receives commands from the processing module 600 and the addressing mode of the storage device 602 is not detected by the accessing module 604. When detecting the addressing mode of the storage device 602, the detection unit 606 adjusts the control signal CON for instructing the multiplexer 608 to connect the detection unit 606, and adjusts the mode control signal MCON for instructing the storage device controller 610 to exchange signals between the detection unit 606 and the storage device 602 with the addressing mode AM1. The detailed operations of the detection unit 606 detecting the addressing mode of the storage device 602 can be referred to the above descriptions, and are described herein for brevity.

After detecting the addressing mode of the storage device 602, the detection unit 606 adjusts the control signal CON for instructing the multiplexer 608 to connect the processing module 600 and the storage device controller 610, and adjusts the mode control signal according to the detected result. As a result, the detection unit 606 may perform the method 20 or the method 40 for detecting the addressing mode of the storage device 602. The electronic system 60 therefore can correctly operate without using a bootstrap pin for indicating the addressing mode of the storage device.

To sum up, via comparing two data acquired by issuing two different addresses, the methods of the above embodiments can detect the addressing mode of the storage device. The trace of the electronic system can be therefore simplified without using a bootstrap pin for indicating the addressing mode of the storage device such as an SPI flash memory. Further, the cost of the electronic system can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for determining an addressing mode of a storage device, comprising:
   issuing a first address and a second address in a first addressing mode;
   converting the first address and the second address as a first device address and a second device address, respectively, according to the addressing mode of the storage device;
   acquiring a first data according to the first device address;
   acquiring a second data according to the second device address; and
   determining whether the addressing mode of the storage device is the first addressing mode or a second addressing mode according to whether the first data and the second data are the same;
   wherein the first addressing mode comprises more bytes than the second addressing mode.

2. The addressing mode detecting method of claim 1, wherein the storage device is a serial peripheral interface flash memory.

3. The addressing mode detecting method of claim 1, wherein the second address equals the first address plus a least significant bit with the first addressing mode.

4. The addressing mode detecting method of claim 1, wherein the step of acquiring a first data according to the first device address comprises:
   acquiring the first data by reading a first plurality of contiguous bytes starting from the first device address of the storage device.

5. The addressing mode detecting method of claim 4, wherein the step of acquiring a second data according to the second device address comprises:
   acquiring the second data by reading a second plurality of contiguous bytes starting from the second device address of the storage device;
   wherein a number of bytes of the first plurality of contiguous bytes is the same with that of the second plurality of contiguous bytes.

6. The addressing mode detecting method of claim 4, wherein the step of acquiring a first data according to the first device address comprises:
   skipping the first device address by a specific amount of bytes until bytes of a first plurality of contiguous bytes are not all the same as a first detection address; and
   acquiring the first data by reading the first plurality of contiguous bytes starting at the first detection address.

7. The addressing mode detecting method of claim 6, wherein the step of acquiring a second data according to the second device address comprises:
   skipping the second device address by the specific amount of bytes as a second detection address; and
   acquiring the second data by reading a second plurality of contiguous bytes starting at the second detection address.

8. The addressing mode detecting method of claim 1, wherein the addressing mode of the storage device is the first addressing mode when the first data does not equal the second data.

9. The addressing mode detecting method of claim 1, wherein the addressing mode of the storage device is the first addressing mode when a sequence of the first data does not equal a sequence of the second data.

10. The addressing mode detecting method of claim 1, wherein the addressing mode of the storage device is the second addressing mode when the first data equals the second data.

11. An electronic system, comprising:
    a processing module, for outputting an addressing signal;
    a storage device for storing execution data; and
    an accessing module, for accessing execution data stored in the storage device according to the addressing signal, comprising:
       a detection unit, coupled to the processing module for outputting a plurality of commands comprising a first address and a second address to acquire a first data and a second data, detecting an addressing mode of the storage device by comparing a first data and a second data acquired from the storage device, outputting a control signal according to whether the addressing mode of the storage device is detected and outputting a mode control signal according to the detected addressing mode
       a multiplexer, coupled to the processing module and the detection unit, for switching connections of the detection unit, the processing module and a data terminal according to the control signal; and
       a storage device controller, coupled to the multiplexer and the storage device, for exchanging signals between the data terminal and the storage device according to the mode control signal.

12. The electronic system of claim 11, wherein the storage device is a serial peripheral interface flash memory.

13. The electronic system of claim 11, wherein the detection unit detects the addressing mode of the storage device when the electronic system boots up and the addressing mode of the storage device is not determined by the detection unit.

14. The electronic system of claim 11, wherein the detection unit detects the addressing mode of the storage device when the detection unit receives the addressing signal from the processing module and the addressing mode is not determined by the detection unit.

15. The electronic system of claim 11, wherein the second address equals the first address plus a least significant bit.

16. The electronic system of claim 11, wherein when the detection unit determines the addressing mode, the detection unit outputs the control signal for instructing the multiplexer to connect the detection unit and the storage device controller for transmitting the plurality of commands to the storage device controller and outputs the mode control signal for instructing the storage device to transmit the plurality of commands in a specific addressing mode for acquiring the first data and the second data.

17. The electronic system of claim 11, wherein when the first data does not equal the second data, the detection unit determines the addressing mode of the storage device is the first addressing mode.

18. The electronic system of claim 11, wherein when a sequence of the first data does not equal a sequence of the second data, the detection unit determines the addressing mode of the storage device is the first addressing mode.

19. The electronic system of claim 11, wherein when the first data equals the second data, the detection unit determines the addressing mode of the storage device is the second addressing mode.

20. The electronic system of claim 11, wherein when the addressing mode of the storage device is determined by the detection unit, the detection unit accordingly outputs the control signal for instructing the multiplexer to connect the processing module and the storage device controller and outputs the mode control signal for instructing the storage device controller exchanging signals between the processing module and the storage device according to the detected addressing mode.

* * * * *